US008533659B2

(12) United States Patent
Joukov et al.

(10) Patent No.: US 8,533,659 B2
(45) Date of Patent: Sep. 10, 2013

(54) EFFICIENT EXTRACTION OF SOFTWARE DEPENDENCIES FROM PROGRAM CODE

(75) Inventors: Nikolai A. Joukov, Thornwood, NY (US); Birgit M. Pfitzmann, Valhalla, NY (US); Marco Pistoia, Amawalk, NY (US); Vasily Tarasov, Stony Brook, NY (US); Takaaki Tateishi, Kanagawa-ken (JP); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 12/511,506

(22) Filed: Jul. 29, 2009

(65) Prior Publication Data

US 2011/0029946 A1 Feb. 3, 2011

(51) Int. Cl.
*G06F 9/44* (2006.01)

(52) U.S. Cl.
USPC .......................................... 717/101

(58) Field of Classification Search
USPC .................................. 717/100–167
See application file for complete search history.

(56) References Cited

U.S. PATENT DOCUMENTS

| | | | |
|---|---|---|---|
| 5,303,379 A * | 4/1994 | Khoyi et al. ................ | 717/166 |
| 7,076,804 B2 | 7/2006 | Kershenbaum et al. | |
| 7,289,948 B1 | 10/2007 | Mohri | |
| 7,530,107 B1 | 5/2009 | Ono et al. | |
| 2004/0268308 A1* | 12/2004 | Srivastava et al. ............ | 717/120 |
| 2009/0100415 A1* | 4/2009 | Dor et al. ...................... | 717/131 |
| 2010/0005455 A1* | 1/2010 | Gyure et al. .................. | 717/128 |

OTHER PUBLICATIONS

Mohri, Regular Approximation of Context-Free Grammars Through Transformation, Jean-Claude Junqua and Gertjan van Noord (eds), Robustness in Language and Speech Technology, Kluwer Academic Publishers, 2000, pp. 251-261.
Aho et al., Compilers, Principles, Techniques, and Tools, 1986, Chapter 10, pp. 585-722.
Fink et al., Effective Typestate Verification in the Presence of Aliasing, ISSTA 06, Jul. 17-20, 2006, pp. 1-12.
Bierhoff et al., Modular Typestate Checking of Aliased Objects, OOPSLA '07, Oct. 21-25, 2007, pp. 1-19.
Shoham et al., Static Specification Mining Using Automata-Based Abstractions, ISSTA'07, Jul. 9-12, 2007, pp. 174-184.
Nederhof, Practical Experiments with Regular Approximation of Context-Free Languages, 2000 Association for Computational Linguistics, vol. 26, No. 1, pp. 17-44.
Grove, A Framework for Call Graph Construction Algorithms, ACM Transactions on Programming Languages and Systems, vol. 23, No. 6, Nov. 2001, pp. 685-746.
Cytron et al., Efficiently Computing Static Single Assignment Form and the Control Dependence Graph, ACM Transactions on Programming Languages and Systems, vol. 13, No. 4, Oct. 1991, pp. 451-490.

(Continued)

*Primary Examiner* — Anna Deng
(74) *Attorney, Agent, or Firm* — Louis J. Percello; Ryan, Mason & Lewis, LLP

(57) ABSTRACT

Calls to stop functions are identified in a computer program file. The stop functions are functions that interact with external resources. Parameters of the calls to the stop functions that are references to the external resources are identified. An analysis is performed over the computer program file to find out possible values of the parameters of the calls.

18 Claims, 10 Drawing Sheets

(56) References Cited

OTHER PUBLICATIONS

Geay et al., Modular String-Sensitive Permission Analysis with Demand-Driven Precision, pp. 1-11. IEEE Computer Society, International Conference on Software Engineering, Proceedings of the 31st International Conference on Software Engineering, 2009, pp. 177-187.

Baldwin, Constructing Regular Expressions from DFAs, Geneseo CSci 342 DFA to Regular Expression, 2006, pp. 1-5.

Minamide, Static Approximation of Dynamically Generated Web Pages, WWW 2005, May 10-14, 2005, pp. 432-441.

Wala, T.J. Watson Libraries for Analysis, Main Page, Walawiki, http://wala.sourceforge.net/wiki/index.php/Main_Page, Jan. 2010.

Context-free grammar, http://www.fact-index.com/c/co/context_free_grammar.html, pp. 1-4, Jan. 2010.

Cavaj Java Decompiler V1.11, http://www.bysoft.se/sureshot/cavaj/ pp. 1, Jan. 2010.

Apache FtpServer, http://mina.apache.org/ftpserver/ pp. 1-3, Jan. 2010.

Data-flow analysis, Wikipedia, http://en.wikipedia.org/wiki/Data_flow_analysis, pp. 1-7., Jul. 2009.

Reaching definition, Wikipedia, http://en.wikipedia.org/wiki/Reaching_definition, pp. 1-2. Jul. 2009.

Christensen et al., Precise Analysis of String Expressions, BRICS, pp. 1-17., 2003.

Java String Analyzer, http://www.brics.dk/JSA/pp. 1, Jun. 2009.

Christensen et al., Precise Analysis of String Expressions, BRICS, Abstract., 2003.

* cited by examiner

```
String a = "a";
for (int i = 0; i < 3; i++)
    a = a + "a";
String r = a;
```

A: ANY CHARACTER

```
public class MyClass {
  static public void main(String args[]) {
    String a = "a";
    String b = "b";
    String r = nappend(a, b, 3);
  } public void nappend(String x, String y, int n) {
    String r = null;
    if (n == 0) {
      r = x;
    }
    else {
      r = nappend(x + y, y, n-1);
    }
    return r;
  }
}
```

```
main(String)
  2.  a = "a"
  3.  b = "b"
  4.  r = nappend(a, b, 3)

nappend(String)
  1.  b1 = n == 0
  2.  goto 6 if b1
  3.  v1 = x + y
  4.  r1 = nappend(v1, y, n-1)
  5.  goto 8
  6.  r2 = x
  7.  goto 8
  8.  r = phi(r1, r2)
  9.  return r
```

$$S_a^1 \to a \qquad S_x^2 \to S_a^1$$
$$S_b^1 \to b \qquad S_y^2 \to S_b^1$$
$$S_{v1}^2 \to S_x^2 \, S_y^2 \qquad S_r^1 \to S_r^2$$
$$S_{r2}^2 \to S_x^2 \qquad S_x^2 \to S_{v1}^2$$
$$S_r^2 \to S_{r1}^2 \qquad S_y^2 \to S_y^2$$
$$S_r^2 \to S_{r2}^2 \qquad S_{r1}^2 \to S_r^2$$

FIG. 13A

```
C:\>type VerifyDBCredentials.java
import java.sql.Connection;
import java.sql.DriverManager;
import java.sql.SQLException;
import java.util.Properties;

enum DbType {
      CLIENTSDB, PARTNERSDB, EMPLOYEESDB;
} enum DbGeneration {
      OLD, NEW;
} class DbAccess {
      Properties props;
      DbGeneration dbgen;
      String url;

public String getURL() {
            return url;
      } public DbAccess(DbType dbtype, DbGeneration dbgen, Properties p) {
            this.props = p;
            this.dbgen = dbgen;

url = "jdbc:db2:";

switch (dbtype) {
            case CLIENTSDB:
                  url += "//frontserver/clientsdb";
                  break;
            case PARTNERSDB:
                  url += "partnersdb";
                  break;
            case EMPLOYEESDB:
                  url += "employeesdb";
                  break;
            default:
                  throw new IllegalArgumentException("Illegal argument's value");
            } if (dbgen == DbGeneration.OLD)
                  url += "_oldscheme";
      }
```

FIG. 13B

```
        Connection connect() throws SQLException {
                if (dbgen == DbGeneration.OLD)
                        return connectOld();
                return DriverManager.getConnection(url, props);
        }

Connection connectOld() throws SQLException {
                return com.ibm.db2.jcc.DB2Driver().connect(url, props);
        }
} public class VerifyDBCredentials {
        public static void main(String args[]) {
                try {
                        Class.forName("com.ibm.db2.jcc.DB2Driver") ;
                        for (DbType dbt : DbType.values()) {
                                DbAccess dba = new DbAccess(dbt, DbGeneration.NEW,
System.getProperties());
                                System.out.println("Connecting to " + dba.getURL());
                                Connection conn = dba.connect();
                                conn.close();
                        } for (DbType dbt : DbType.values()) {
                                DbAccess dba = new DbAccess(dbt, DbGeneration.OLD,
System.getProperties());
                                System.out.println("Connecting to " + dba.getURL());
                                Connection conn = dba.connect();
                                conn.close();
                        }

System.out.println("Credentials are valid for all
databases");
                } catch (Exception e) {
                        System.out.println("Something is wrong: " + e.getMessage());
                }
        }
}

C:\>java VerifyDBCredentials
Connecting to jdbc:db2://frontserver/clientsdb
Connecting to jdbc:db2:partnersdb
Connecting to jdbc:db2:employeesdb
Connecting to jdbc:db2://frontserver/clientsdb_oldscheme
Connecting to jdbc:db2:partnersdb_oldscheme
Connecting to jdbc:db2:employeesdb_oldscheme
Credentials are valid for all databases=
```

EFFICIENT EXTRACTION OF SOFTWARE DEPENDENCIES FROM PROGRAM CODE

FIELD OF THE INVENTION

The present invention relates to the electrical, electronic and computer arts, and, more particularly, to information technology (IT) management and the like.

BACKGROUND OF THE INVENTION

Modern programs are often large and complex. Typically, programs are obtained by assembling various components at runtime. As a result, it is very difficult to understand what external resources a program may depend on. Detecting such dependencies through manual code inspection is impractical and imprecise. In some cases, the source code of a program may not even be available. Therefore, manual code inspection may not even be an option. At the same time, server virtualization or migration; application consolidation; security, reliability, and isolation assessment; smart backup and recovery planning; and a number of other management tasks require the knowledge of external and cross-program dependencies.

SUMMARY OF THE INVENTION

Principles of the invention provide techniques for efficient extraction of software dependencies from program code. In one aspect, an exemplary method includes the step of identifying, in a computer program file, calls to stop functions. The stop functions are functions that interact with external resources. An additional step includes identifying parameters of the calls to the stop functions that are references to the external resources. A further step includes performing an analysis over the computer program file to find out possible values of the parameters of the calls.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention may offer one or more of the following technical benefits:
  greater completeness in terms of results
  greater speed
  greater convenience as compared to a case where monitoring software must be installed
  greater security.

These and other features, aspects and advantages of the invention will become apparent from the following detailed description of illustrative embodiments thereof, which is to be read in connection with the accompanying drawings.

BRIEF DESCRIPTION OF THE DRAWINGS

FIGS. 13A and 13B present a sample Java program illustrating external resource detection through stop functions and string analysis.

DETAILED DESCRIPTION OF PREFERRED EMBODIMENTS

Figure 1:
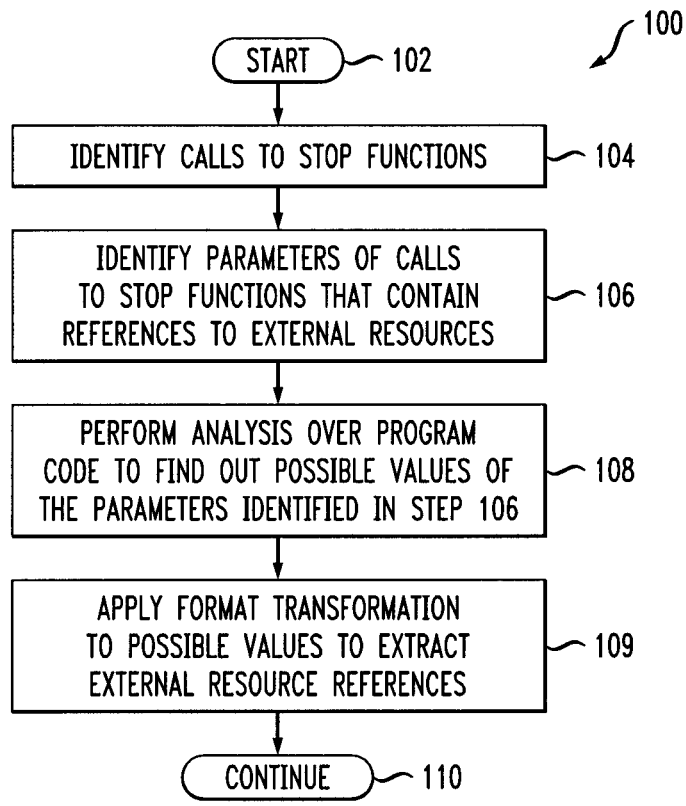
FIG. 1 presents exemplary method steps, according to an aspect of the invention.

As noted above, modern programs are often large and complex. Typically, programs are obtained by assembling various components at runtime. As a result, it is very difficult to understand what external resources a program may depend on. Detecting such dependencies through manual code inspection is impractical and imprecise. In some cases, the source code of a program may not even be available. Therefore, manual code inspection may not even be an option. At the same time, server virtualization or migration; application consolidation; security, reliability, and isolation assessment; smart backup and recovery planning; and a number of other management tasks require the knowledge of external and cross-program dependencies. A non-limiting detailed example for the backup case is presented below.

As used herein, "external resources" are defined as any resources available outside of a given program that a program reads, looks up, interacts with, or writes to during its operation. A non-limiting exemplary list includes:
  shared memory areas,
  files, pipes, and all other file system objects
  data bases
  messaging queues
  network connections
  web objects and virtual web objects (uniform resource locators ("urls"))

Run-time program monitoring can reveal external program dependencies but this technique may not be ideal because of security concerns or performance impact. Furthermore, suitable monitoring tools often have to be installed first as they are rarely present already. In addition, monitoring technologies cannot detect dependencies that are triggered by certain special conditions, such as partial failures, or by certain special inputs, if these special conditions do not occur during the monitoring time or those special inputs are not passed during the monitoring phase. Therefore, run-time program monitoring may not be able to detect all the pertinent dependencies. For similar reasons, testing can only identify some of the resources associated with a program but not necessarily all of them. Some of the resources, which could be accessed by the program along certain paths, may remain undiscovered during testing if the test cases do not exploit those particular paths of execution. Therefore, testing is not trustworthy for this particular purpose. Another possibility is manual code inspection. This alternative, however, is tedious, time-consuming, error-prone, and impractical, especially for large and complex programs.

To detect most or all external dependencies (that is, the pair formed by (i) the program in question, or a parameter in it, and (ii) an external resource that is used) of a system, it is important to extract from the system code most or all references to external resources upon which the system depends. References to such data (i.e., external resources), such as filenames or uniform resource locators (URLs), are usually encoded as string values inside the program. Such (typically) string values may be:

(1) hard-coded;
(2) dynamically constructed by operating on hard-coded values;
(3) obtained from external sources, such as inputs from the user, and/or;
(4) a combination of all the above.

One or more embodiments of the invention provide an efficient solution, which includes extracting from the program code the necessary references to the data plus, potentially, some unnecessary data, while reducing or even minimizing the amount of unnecessary data (that is, keeping the amount of unnecessary data low while keeping the solution efficient). One or more instances of the invention employ static string analysis to detect which resources a software system depends upon. Since references to such resources are usually encoded as strings in a program, as explained above, embodiments of the invention provide a static string analysis to compute the strings representing the resources associated with a program.

FIG. 1 depicts a flow chart 100 of an exemplary method, according to an aspect of the invention, which, after beginning in step 102, includes the step 104 of identifying, in the program, calls to functions that interact with external resources. These functions are referred to herein as "stop functions." Non-limiting examples of stop functions are read, write, execute, delete, connect to, and the like. Another step 106 includes identifying the parameters of these calls (to stop functions) that contain references to external resources (for example, the path and file name of the file being read, written, or deleted; the path and name of the program being executed; or the name and location of the database being connected to). Yet another step 108 includes performing an analysis over the program code to find out the possible values of these (string) parameters. In optional but preferred step 109, apply format transformation(s) to the possible values from step 108 to extract external resource references. In one or more embodiments, these format transformation(s) are stop-function specific. In one or more embodiments, parse the possible values and extract, for example (in the case of a database), the alias, optional server, and port number. For instance, for DB2 database connections in the Java programming language, the first (in this case, only) parameter of this potential stop function:

java.sql.DriverManager.getConnection(String url)

takes the form of

"jdbc:db2:"+alias or

"jdbc:db2://"+server+":"+portNumber+"/"+alias.

Arguments may also be encoded within the parameter, after the alias, to further specify a database reference.

Processing continues at step 110.

An exemplary application of aspects of the invention for analysis of external dependencies in the case of a backup will now be provided, it being understood that this is purely for illustrative purposes, and there are many applications of aspects of the invention besides backup. Given a software system of, for example, one or more of programs, components, and software logical units, it is often necessary to perform backups. Backups are done so as to be able to save work in case the system crashes or gets corrupted, or in case auditing becomes necessary. One potential issue when backing up a software system is in detecting which external resources are associated with that particular system. Those resources should be backed up as well, so that the software system can be fully restored and/or examined at a later time. A similar problem arises when transferring a system from one computer or group of computers to another computer or group of computers, not necessarily for backup reasons, but, for example, when a new computer or group of computers is purchased by a user. For the sake of precision in expression, external dependencies often refer to resources on other computers; thus, when transferring, the overall system will typically end up on several computers again (but considering only the "program," the program would typically be on one computer).

In the case of a transfer, it is necessary to transfer all the external resources referred to by the program so that it can be fully operational in the new computer. If the software components upon which the software system depends are not properly backed up or transferred, the program may not work properly, or may produce inconsistent results. One possible solution is to back up and/or transfer all the data, even that data which is not necessary. However, it may not even be known what "all the data" is, for example, if resources may be accessed via the network. Even if it is known that the program only accesses resources in the same enterprise, transferring all enterprise software and data to new computers at the same time would be extremely unrealistic. This solution, therefore, is not optimal. The amount of unnecessary data may be very large, and backing it up or transferring it may be very inefficient. Furthermore, unnecessary data may be confidential for other applications, and transferring it may cause privacy violations. Embodiments of the invention provide an improved, and even an optimal solution to this problem, by extracting only the data that is necessary. This implies that one has to know in detail which external data a software system relies on.

Identifying Stop Functions

Figure 2:
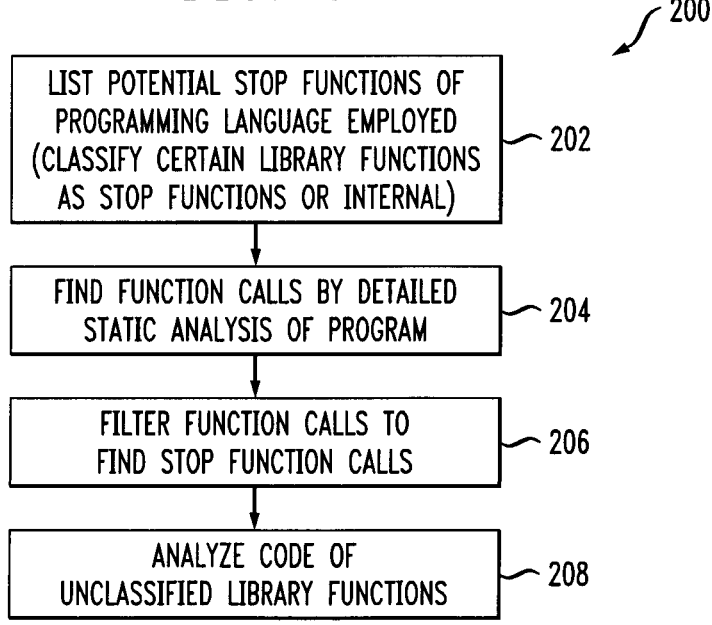
FIG. 2 illustrates one non-limiting exemplary way to carry out step 104 of FIG. 1, according to another aspect of the invention.

FIG. 2 presents a flow chart 200 of one specific way to carry out step 104. As per step 202, prior to the analysis of any particular functions, a list can be prepared of potential stop functions of the programming language used. The list may depend on the version of the programming language, or the particular runtime environment such as an interpreter, or a software development kit used for developing the program. There is not necessarily a single definitive list of "all" potential stop functions. The examples above (read, write, and so on) are a small subset of such a list. If a programming language or environment comes with libraries, one may treat some library functions as stop functions directly, if they lead to the use of external resources via known string parameters. Other library functions that never call external resources may be characterized as "internal," so that they can be omitted in later analysis of particular programs.

It should be noted that while in many instances, the resource parameters are string parameters, this may not always be the case. For example, some languages or programs may have types for IP addresses, filenames, URLs, and the like. While potentially these are ultimately strings as well, one or more embodiments of the invention are applicable to an arbitrary resource type system with resource-manipulation functions, of which string-manipulation functions are a special case if general strings are taken as the type.

While analyzing a particular program, the calls to stop functions should be found. This may be done based on a detailed static analysis of the program that finds function calls, as per step 204, by then filtering the function calls for calls to stop functions, as per step 206. The skilled artisan will appreciate that static analysis of programs is a common technique such as used for instance in compiler technology. A non-limiting example of a static analysis technique that will find function calls without all the other elements of a compiler is a call graph generator such as the well-known call graph generation utility "CodeViz."

As per step 208, if the programming language or environment comes with libraries, and concrete function calls to these libraries have not been classified either directly as stop functions or as "internal" in step 202, the code of these functions has to be analyzed in the same way just described.

Figure 3:
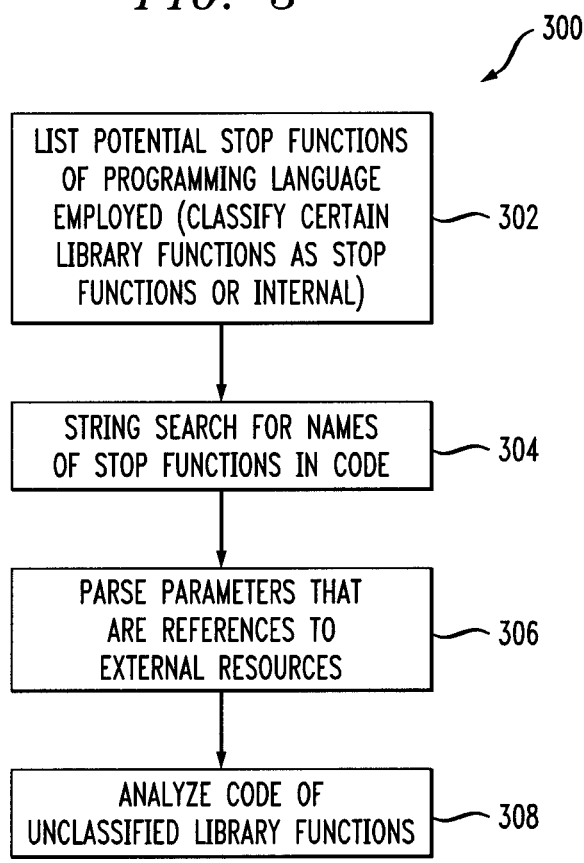
FIG. 3 illustrates another non-limiting exemplary way to carry out step 104 (as well as related steps) of FIG. 1, according to still another aspect of the invention.

FIG. 3 presents a flow chart 300 which includes another specific way to carry out step 104, using steps 302 and 304. Step 302 is the same as step 202. In step 304, carry out a string search for the name of the stop functions in the code. Step 306, analogous to step 106, includes parsing (still with a simple regular expression string parser) of the parameters that are references to external resources. Step 308 again involves analyzing the code of unclassified library functions using in this case the string search just described. The techniques of FIG. 3 are believed to provide, in some instances, a suitable alternative way to approximate the results anticipated from the techniques of FIG. 2, using simpler methods such as the aforementioned string search (for example, "grep"). Note, however, that while in most instances stop function will be called directly by their names, if function names are set dynamically in the program (for example, in Java), then the technique of FIG. 3 is less preferred as compared to FIG. 2. The skilled artisan will appreciate that "grep" is a command line text search utility originally written for UNIX and is but one non-limiting example of a utility that could be used to search for the function names.

It should be noted that in cases where a simple search such for the stop functions is employed in Step 304, such as the aforementioned "grep," there will not always be parameters because the simple search may find some occurrences of the name of the stop function in a program position where it is not a function call. To deal with this situation in Step 306, make another regular expression as if there were parameters, and if there are not, the expression will fail and that occurrence of the name of a stop function is skipped.

In one or more embodiments, steps such as steps 202 and 302 may be implemented in combination with steps such as 204 and 304 as follows. Given a program (thus in Step 204/304), identify all functions called in the program, and all functions defined in the program. The difference corresponds to what has been referred to herein as library functions. They can be quite large in number. Maintain a database (like the list in steps 202/302), but of all library functions yet encountered. Each function is initially categorized as "unclassified" (thus as a function to be treated as in Step 208). When time permits, look up functions in their original definitions and classify them as either internal or stop functions, and optionally have a category such as "difficult" for functions which have already been tried but which have not been able to be classified yet.

String Analysis

A significant aspect of some instances of the string analysis is identifying, in the program, all the invocations of string-transformation functions (however, in alternative instances, a backward search can be done from the variables that denote external resources and only the functions used to construct those are looked at; those will usually indeed be string-manipulation functions but typically far less than all). These functions, such as string concatenations, substring operations, case changes, and the like, manipulate existing strings. Like the stop functions, the string-transformation functions are known a priori. Therefore, identifying calls to those functions statically can be done by traversing the call-graph, which can be built statically. Finally, in one or more embodiments, it is necessary to statically identify the program entry points, that is, the methods or functions through which the program is invoked and through which some string values may be passed to the program. Note, however, that in a backward analysis, even the entry points might come up automatically in some instances: if there is interest in variable x and a statement is found such as x=read( ) without inputs, then it will be known that this is an entry point, and that at this point x has an arbitrary value.

One underlying string analysis technique that can be employed is described in detail below. The skilled artisan will be familiar with same from U.S. Pat. No. 7,530,107 of Ono et al., entitled "Systems, methods and computer program products for string analysis with security labels for vulnerability detection." The complete disclosure of the aforesaid U.S. Pat. No. 7,530,107 is expressly incorporated herein by reference in its entirety for all purposes.

Also expressly incorporated herein by reference in its entirety for all purposes is the article by Emmanuel Geay, Marco Pistoia, Takaaki Tateishi, Barbara G. Ryder, and Julian Dolby, entitled "Modular string-sensitive permission analysis with demand-driven precision," published by the IEEE Computer Society, Washington, D.C., USA, in the icse, pp. 177-187, 2009 IEEE 31st International Conference on Software Engineering, 2009.

Referring back to step 108, one or more instances of the invention identify, using data-flow analysis, which string values are used as external references in stop functions. The "parameters of calls to stop functions that are references to external resources" have been determined from step 106, and now their values are determined. Not all the string values manipulated by a program are important; some of them may not be associated with any resource. For those string values that matter, the actual string values should be identified. That is, in principle, one performs a backward analysis of each of the string variables (parameters resulting from step 106) in the stop functions, across the string-manipulating functions by which it was constructed, to find out what values the resulting string may have. One or more embodiments of the invention statically compute an over-approximation of the set of these values using string analysis.

Consider the following exemplary program using an external resource:

```
string DBhome = "C:/db/";
string EmpDB = DBhome + "EmployeeDatabase1";
connect(EmpDB, uid, passwd);
```

Step 104 identifies the stop function 'connect' in the program.

Step 106 defines the parameter 'EmpDB' as the parameter of 'connect' that references the external resource (a database).

Step 108 has to find out the possible values of 'EmpDB'. Performing a string analysis manually, note that 'EmpDB' is always constructed with the string-manipulation operator '+,' which denotes concatenation of two strings. The second of these is the string constant "EmployeeDatabase1," while the first is a variable 'DBhome.' Further backward analysis shows that 'DBhome' is always set to the string constant "C:/db/." Hence 'EmpDB' always has the value "C:/db/EmployeeDatabase1." Thus, the external resource "C:/db/EmployeeDatabase1" has been identified.

In the example above, a stop function's parameter can take only one value—"C:/db/EmployeeDatabase1". However, often a stop function's parameter can take several possible values. FIGS. 13A and 13B show a sample java program. It connects to several DB2 databases, obtaining the connection information from system properties and hard-coded values.

The program begins, in the main routine, by loading the java classes which contain the DB2 database driver. It then creates a DB object for each database used in the system and tests if it can connect to these databases with current credentials.

There are three databases used by the system: clients database ("clientsdb") residing on remote "frontserver", and partners ("partnersdb") and employees ("employeesdb") databases located on the server where the application is running. Also, there are two generations of each database. The old generation uses the old scheme and the new generation uses the new scheme. If the constructor of the DbAccess object was called with certain parameter(s), then the program adds the postfix "oldscheme" to the database's name.

Depending on the parameters that the constructor of the DbAccess object was called with, the url field will be set to different values:
jdbc:db2://frontserver/clientsdb
jdbc:db2:partnersdb
jdbc:db2:employeesdb
and
jdbc:db2://frontserver/clientsdb_oldscheme
jdbc:db2:partnersdb_oldscheme
jdbc:db2:employeesdb_oldscheme After an instance of the DB object has been constructed, its connect method is called. This method regularly uses the standard DriverManager.getConnection method of the Java Runtime library to create a connection to the database. If a connection can be made without error, a message is printed to the console. In the event of an error, an error message is printed instead. To the databases with the old scheme, the DB object connects directly through the DB2 Driver (com.ibm.db2.jcc.DB2Driver( ).connect). This is an example of how stop functions allow detection of external DB2 database resources even in code which circumvents the standard programming convention of using the Java DriverManager, and instead calls the DB2 libraries directly.

External resources can be identified from static analysis of this program with the use of stop functions. String analysis will show that the url passed into the connect java library stop function is one of the strings indicated above. Because the url follows the well known naming convention for database URLs, the database name can be extracted from the url value.

Stop functions used in this figure include:
java.sql.DriverManager.getConnection(String, Properties)
and
com.ibm.db2.jcc.DB2Driver.connect(String, Properties).

String analyses are static program analysis techniques to infer string values arising at runtime without executing a program. One non-limiting example is a Java String Analyzer (JSA), which outputs regular expressions. Another non-limiting example approximates possible string values by a Context-Free Grammar (CFG). Thus, the resulting sets of string values can be more precise than the ones of JSA.

Figure 4:
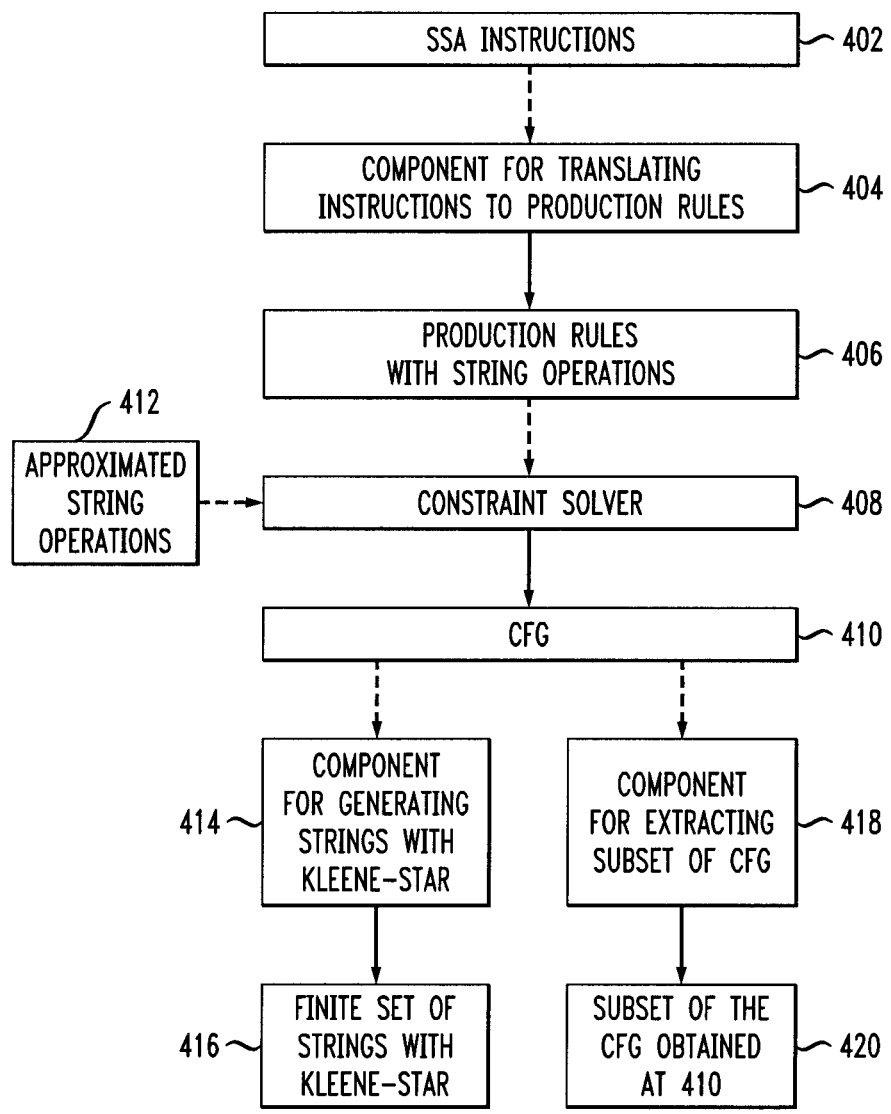
FIG. 4 presents an overview of string analysis, useful in practicing one or more embodiments of the invention (for example, to carry out step 108 of FIG. 1)

As seen in FIG. 4, which presents an overview of one non-limiting exemplary approach to string analysis, Static Single Assignment (SSA—discussed further below) instructions 402 are provided to a component 404 for translating instructions to production rules. To obtain the SSA instructions, for example, take the result of step 106 and transform the given program with annotated parameters into SSA form. This step is explained below as the transformation from the program in FIG. 7 to the form in FIG. 8.

The output 406 includes production rules with string operations. Thus it is already related to a CFG, but may not only contain constant assignments and concatenations as in a CFG, but arbitrary string operations. Such output 406 as well as approximated string operations 412 (discussed further below) are input into constraint solver 408, which outputs CFG 410. A constraint solver is only one non-limiting example of a tool for performing the CFG transformations and optimizations needed to transform output 406 into a CFG. Optionally, CFG 410 may be provided to a component 414 which further over-approximates the CFG by a regular language for easier readability by humans, and in one non-limiting example by representing the regular language by a finite set of strings 416 with kleene-star, where the kleene-star is represented by "*". The "kleene-star" operator is defined as follows: an expression x* for a string x denotes any number of iterations of the string x, thus the empty string, x, xx, xxx, and so on. Optionally, CFG 410 is also provided to a component 418 for extracting a subset of the CFG, with the resultant subset output at 420.

In one or more embodiments, approximate the possible string values of a string expression by a CFG. As noted below, soundness means that a resulting CFG computed by the string analysis contains all the actual strings arising at runtime. By "approximation" is meant the same thing: there might be too many strings in the CFG but not too few—no matter what representation of strings are obtained (list, regular expression, CFG) this is what is desired.

The constraint solver 408 transforms the production rules with string operations to a CFG while removing those string operations by applying approximated string operations 412, which are modeled by simple replacements of production rules with string operations, transducers, and other mathematical functions. For example, the string concatenation s=s1+s2 is translated to the production rule s→+(s1,s2) with the string operation+by the component 404, then transformed to the production rule s→s1 s2 by the constraint solver 408 by the simple replacement (because concatenation is a basic operation of a CFG and does not need an approximation).

Figures 5, 6, 7:
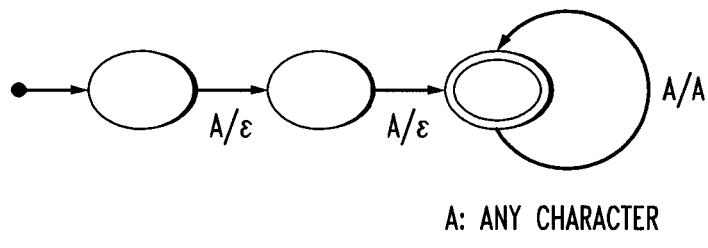
FIG. 5 is an exemplary Java (mark of Sun Microsystems, Inc., Santa Clara, Calif., USA) program to which string analysis may be applied.
FIG. 6 shows an exemplary transducer.
FIG. 7 is another exemplary Java program to which string analysis may be applied.

Given the Java program of FIG. 5, which appends "a" to the string assigned to the variable a three times after initializing it with "a.", the following CFG is obtained through the component 404 and the constraint solver 408:

$$S_a \to a$$

$$S_a \to S_a a$$

$$S_r \to S_a$$

While in reality this transformation passes through the SSA stage, it will be appreciated that in this simple example, these productions result from lines 1, 3, and 4 of the program, respectively. While the specific exemplary string analysis sample does not evaluate line 2 and thus does not limit how many letters "a" are added to the string, a more complex static analysis that would roll out this loop with 3 iterations and thus found that precisely 3 letters "a" are added, when available, could equally be used within the one or more embodiments of the overall invention.

When a program is encountered that uses predefined string operations such as String.substring as shown in the following program, a sound approximation can be employed for every string operation to translate a CFG to a CFG. These sound approximations may be prepared as a library 412. If new string operations are encountered, the library may be extended.

```
String a = "xxa";
for (int i=0; i<3; i++) a = a + "a";
String r = a.substring(2);
```

Intuitively, soundness means that a resulting CFG computed by the string analysis contains all the actual strings arising at runtime. (The soundness is formally defined as follows: f is a sound approximation for a string operation f iff for all sets S of strings, S' ⊂ f(S) where S'={s'|s'=f(s), s ∈ S}). Soundness of an approximation of an operation means that for all input sets, the output set of the approximation is a superset of the output set of the original operation. One of the methods to approximate predefined string operations is to use a transducer which is an automaton with output. It is well known to the skilled artisan (see Yasuhiko Minamide, "Static approximation of dynamically generated web pages," in WWW '05: Proceedings of the 14th international conference on World Wide Web, pages 432-441, New York, N.Y., USA, 2005 ACM Press, and references therein) that the image of a CFG under a transducer is also a CFG. The complete Minamide reference is expressly incorporated by reference herein in its entirety for all purposes. FIG. 6 shows a transducer substring (_, 2). The transitions labeled with A/ϵ indicate that the transducer will produce the empty string for the first two input characters, and the transitions labeled with A/A indicate that the transducer will produce a string consisting of the remaining input characters, where A stands for an arbitrary character. Other methods to approximate predefined string operations include homomorphisms on (Σ, +) where Σ is a set of characters and + denotes concatenation; functions that always return the same CFG yielding all the possible strings returned by corresponding predefined string operations; and so on. The following production rules with the approximated string operation substring (_, 2) are the ones obtained from the program just above:

$S_a \to xxa$ $S_a \to S_a a$ $S_r \to \text{substring}(S_a, 2)$

The approximated string operation substring (_, 2) is defined by the transducer shown in FIG. 6 and is a sound approximation for the string operation_.substring(2). By applying that transducer to the grammar and using the constraint solver 408, the following CFG is obtained, which represents the set {"a," "aa," "aaa," "aaaa," ... }:

$S'_a \to a$ $S'_a \to S'_a a$ $S_r \to S'_a$

The constraint solver may also be used to optimize a CFG. E.g., consider the program

```
a = "a";
for (int i = 0; i < 3; i++) a = a + "a";
r = a;
r = r + "a";
```

The initial CFG derived directly from the production rules 406 is $S_a \to a$ $S_a \to S_a + a$ $S_r \to S_a$ $S_r \to S_r + a$ If there is interest only in the possible values of r, then $S_r$ is the start symbol of this grammar, and the constraint solver 408 may optimize this grammar to $S_r \to a$ $S_r \to S_r + a$ A non-limiting example will now be provided regarding implementation of the string analysis. The description first deals with intra-procedural string analysis, and then explains how to extend that to inter-procedural string analysis. The implementation details presented herein assume for illustrative purposes that the string analysis has been implemented on top of the static analysis framework known as "T. J. Watson Libraries for Analysis (WALA)," available as an open source product from SourceForge, Inc., 650 Castro Street, Suite 450, Mountain View, Calif. 94041 USA. The skilled artisan will be familiar with WALA.

Figures 8, 9, 10:
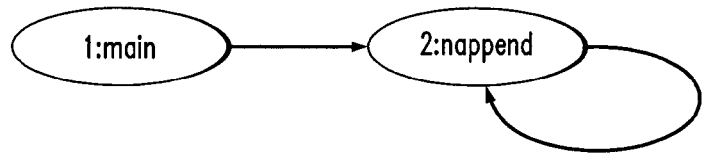
FIG. 8 depicts the Java program of FIG. 7 in a pseudo-Static Single Assignment (SSA) form.
FIG. 9 presents a call graph for the program of FIG. 7.
FIG. 10 presents production rules translated from FIG. 8.

To illustrate the intra-procedural string analysis, consider the "nappend" method shown in FIG. 7, which intuitively applies the string 'y' to the string 'x' for 'n' times. The first step of analysis is to translate the program into Static Single Assignment (SSA) form as shown in FIG. 8, where pseudo notations have been employed for instructions:

v=val for an assignment of a value val to a variable or a field v;
v=obj.func(v1, . . .,vn) for a method invocation of the function func of object obj with arguments v1, . . .,vn;
  goto N for an unconditional jump to the label N; and
  goto N if v for a conditional jump to the label N by the condition v.

The skilled artisan will be familiar with SSA from, for example, Ron Cytron, Jeanne Ferrante, Barry K. Rosen, Mark N. Wegman, and F. Kenneth Zadeck, Efficiently computing static single assignment form and the control dependence graph, *ACM Trans. Program. Lang. Syst.*, 13(4):451-490, 1991.

In addition, the SSA transformation introduces new variables and a ϕ-function, which is denoted by phi(v1,v2), to yield a program which has only one assignment to each variable. The ϕ-function joins the values of several variables. This characteristic of the SSA form is suitable to find data dependencies. Then translate the assignments in SSA form to a set of production rules with string operations, except for conditional and unconditional jumps, in the same manner described above. In particular, v=phi(v1,v2) is translated into two production rules $S_v \to S_{v1}$ and $S_v \to S_{v2}$ so as to make it represent a union of the two sets of strings assigned to v1 and v2, respectively. According to this translation, the following production rules can be obtained from the pseudo SSA form of the nappend method:

$$S_{v1} \to S_x S_y$$

$$S_{r1} \to \text{napped}(S_{v1}, S_y, n-1)$$

$$S_{r2} \to S_x$$

$$S_r \to S_{r1}$$

$$S_r \to S_{r2}$$

For the inter-procedural string analysis, the intra-procedural string analysis is naturally extended with the call graph information constructed by WALA, whose context-sensitivity can be flexibly controlled. In one or more embodiments, annotate every variable in the SSA program with a call graph node. After that, combine all the production rules, after removing production rules translated from method invocations such as $Sr1 \to \text{nappend}(S_{v1}, S_y, n-1)$. Instead, introduce production rules representing dependencies between the parameters and the return value of a callee method and the variables of a caller method. For example, the following production rules are introduced in the case of a context-insensitive call graph as shown in FIG. 9, where the superscript of each nonterminal represents the corresponding call graph node. Note that FIG. 9 is a call graph for the program in FIG. 7.

$$S_x^2 \to S_a^1 \ S_x^2 \to S_{v1}^2$$

$$S_y^2 \to S_b^1 \ S_y^2 \to S_y^2$$

$$S_r^1 \to S_r^2 \ S_{r1}^2 \to S_r^2$$

FIG. 10 shows the complete set of the production rules obtained from the program. Then obtain the following CFG (for example, as output of the constraint solver 408) that predicts possible strings assigned to the variable r in the main method, where the start symbol is $$S_r^1 \to a | S_r^1 b$$

In addition, leverage a pointer analysis in the translation from the program to the production rules with string operations in order to make the string analysis more precise. In particular, the pointer analysis helps the string analyzer to identify how constant strings flow to variables across methods and to identify whether the same objects are assigned to different variables in potentially different methods, even if those objects are dynamically created.

It is well-known to the skilled artisan (see, for example, An Introduction to the Theory of Computation, Eitan Gurari, Ohio State University, Computer Science Press, 1989, ISBN 0-7167-8182-4) that a CFG can be over-approximated by a regular grammar and it can be translated to a regular expression through the transformation from the regular grammar to a finite-state automaton (Step 414). The complete Gurari reference is expressly incorporated herein by reference in its entirety for all purposes. In one or more embodiments, this step may be extended by transforming the resulting regular expression into a finite set of strings with "kleene-star," which is also a set of regular expressions without the choice operator. For example, with the above transformations, the following CFG can be transformed to the set of strings {"ac*", "bc*",}:

$$S_r^1 \to a|b|S_r^1 c$$

It should be noted that in one or more embodiments, it is desired to obtain resource dependencies. As noted, in some instances, one result is a context-free grammar (CFG)(mentioned above). In order to obtain the actual resources from the CFG, possible approaches include:

comparing with lists of available resources (comparing whether a specific resource is contained in the set of strings described by a CFG is the word problem for context-free grammars for which there are many well-known efficient techniques in particular in the area of language parsing);

classifying stop functions by resource types (other hosts, databases, files, and the like) and comparing more narrowly with resources of those types;

comparing with sets of resources of which no full list is available by exploiting known name formats or production rules (for example, if it is known that a parameter is a hostname, a list of all hosts on earth is not available, but it may be possible to compare more cleverly with DNS tables, or as a minimum, given the format of DNS entries, to restrict what servers a CFG might contain). The format may be described by a regular expression, and it is well-known to the skilled artisan that the intersection of a CFG and a regular expression can be computed in polynomial time (see, for example, "Formal Languages and Compilation," Series: Texts in Computer Science, by Stefano Crespi Reghizzi, Springer Science and Business Media New York 2009, XII, 368 p. 100 illus., Hardcover, ISBN: 978-1-84882-049-4, the complete text of which is expressly incorporated herein by reference in its entirety for all purposes).

It may also be desirable to carry out Step 109 (that is, to apply format transformation to possible values to extract external resource references) on the resulting CFG. Typically, the desired extraction or transformation can be represented as a transducer, and that transducer can be applied to the CFG by the same method as used above. In particular, the transducers needed here may often be substring transducers similar to the one described above in order to extract different parts of the resource strings such as "server" or "port number" in the example above, or transducers that extract substrings between certain symbols such as ":" and "/" in the example above. We may also use the transducer on a simpler approximation of the CFG by a regular expression or a set of strings with Kleene-star as obtained in Step 414.

If we carry out Step 109, then the approaches for obtaining actual resources will typically be performed on the result of this step. For instance, we may first want to extract the hostname string part from a longer reference and then intersect the resulting CFG or regular expression with a regular expression for correct hostnames.

In some cases, a complex CFG may not be present and it may be possible to simply read off a resource name from a simple grammar.

It should also be noted that while an exemplary embodiment has been presented in the context of source code, some embodiments may be applicable to object code. In such cases, some of the external resources may be accessed by normal jumps or calls to addresses outside the address space of this program, while others are accessed via traps to the operating system (OS). The traps and their parameters can be treated like stop functions. There will be a finite number of traps, and the parameters correspond to a register or stack layout.

Note that binary-based analysis will not be always possible and will be OS and language-specific. Some of the stop function cases that can be detected even from binaries will now be discussed. "Binary" Java class files and most other binaries contain information about the original program. Depending on compilation-time parameters, whole source code can be included with the binaries or just function and variable names. Publicly available tools can reconstruct Java code from class files. One non-limiting example is the Cavaj Java Decompiler V1.11, available from Sureshot Software. Similar tools are available for other languages and their usefulness will vary depending on compilation options.

Furthermore, some library calls have standard interfaces that can be declared as stop functions. For example, in Linux all system calls (for example, functions to open a file) are called via interrupt 80. Each system call has a unique number that is a parameter to the interrupt call. File open call has ID=5. Therefore, a signature of a stop function such as open in a binary program would be similar to: eax=05, int 80. Variables that point to file names would be in other registers. The exact binary code signatures would vary slightly depending on the compiler but there will be a small set of them.

One or more embodiments of the invention may provide one or more advantages. In the following, certain potential disadvantages of one or more techniques not employing embodiments of the invention will be discussed, as will one or more potential advantages of one or more embodiments of the invention. It is to be emphasized that not every embodiment of the invention necessarily has every advantage, or addresses every disadvantage of other techniques.

If one or more techniques of the invention were not employed, run-time program monitoring could potentially reveal external program dependencies but this might not be ideal because of security concerns or performance impact. In addition, certain monitoring technologies not employing one or more embodiments of the invention cannot detect dependencies that are triggered by certain special conditions, such as partial failures, or by certain special inputs, if these special conditions do not occur during the monitoring time or those special inputs are not passed during the monitoring phase. Therefore, run-time program monitoring, without one or more embodiments of the invention, may not be able to detect all the dependencies. It is believed that monitoring techniques, without employing one or more embodiments of the invention, will not yield all external resources—only these that were used during the monitoring interval. For similar reasons, testing, without employing one or more embodiments of the invention, can only identify some of the resources associated with a program but not necessarily all of them. Some of the resources, which could be accessed by the program along certain paths, may remain undiscovered during testing if the test cases do not exploit those particular paths of execution. Therefore, testing, without using one or more embodiments of the invention, is likely not trustworthy for this particular purpose. Another possible approach not employing one or more embodiments of the invention is manual code inspection. This alternative, however, is tedious, time-consuming, error-prone, and impractical, especially for large and complex programs.

One or more embodiments of the invention provide greater completeness in terms of identifying dependencies, as compared to monitoring and testing. Once the stop functions are identified, the resource parameters can readily be completed, and the search method and the string analysis method are sound. One or more embodiments of the invention advantageously detect dependencies that are almost never used and thus hard to detect for monitoring. However, it is not believed that all embodiments of the invention achieve 100% completeness in terms of identifying dependencies. In case all stop functions and all parameters cannot be identified or located, a supplemental analysis can be carried out (still off-line, without running the program). For example, in a case where tables may potentially be employed to implement dynamic function calls, a "grep" search function as in Step 304 could be employed in addition to a static analysis as in Step 204, and occurrences of stop function names in places where they are not direct function calls can be post-processes manually; this should usually be a small number of occurrences.

Additional advantages include greater evaluation speed. Monitoring for external dependencies is typically done for several weeks, for example, trying to catch at least one entire month because there may be special month-end activities. Static analysis can typically be done in minutes. Furthermore, one or more embodiments have little or no performance impact on the running program. It is true that a monitoring approach could be carried out on a test server, which would also not impact the real running program, but it is difficult to accurately reproduce a working test environment for the program, in particular if one does not know all the external dependencies yet. Furthermore, even if one starts to run, observes missing dependencies, and adds them one by one, it may not fully work because, for example, one cannot easily produce suitable test databases, and so on. For example, one would essentially need to do complete application migration and testing just to get a test environment for analysis.

Furthermore, suitable monitoring tools need to be installed in a monitoring approach, as such tools are rarely present. In some cases, monitoring tools might be overly intrusive and lead to security concerns.

Figure 11:
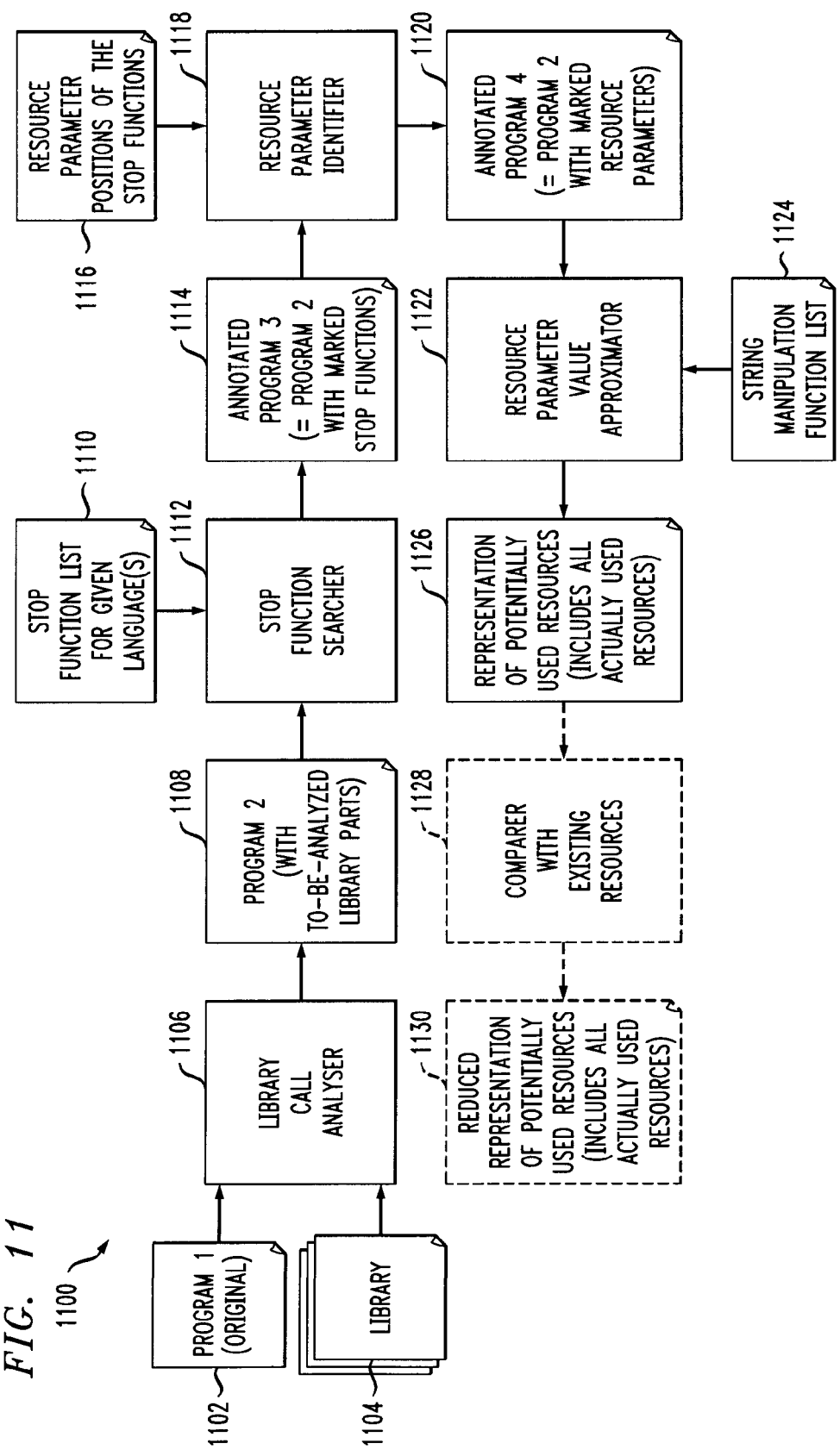
FIG. 11 is a block diagram of an exemplary software architecture, according to another aspect of the invention.

Attention should now be given to FIG. 11, which presents a block diagram 1100 of an exemplary system, according to an aspect of the invention. An original program 1102 and a library 1104 are taken as inputs to a library call analyzer module 1106, which outputs a second program 1108, which is the first program augmented with the library parts to be analyzed. The second program is taken as input to stop function searcher module 1112, which also takes as input the stop function list 1110 for the given language (see discussion elsewhere herein for the case of binary code). Stop function searcher 1112 outputs third program 1114, which is second program 1108 with marked stop functions. This in turn is input to resource parameter identifier 1118, which also takes as input resource parameter positions of the stop functions 1116.

Module 1118 outputs fourth program 1120, which is a version of the second program that has been annotated by marking the resource parameters. This is in turn input to resource parameter value approximator 1122, which also takes as input string manipulation function list 1124 (which, in the broadest case, may include information about other suitable functions besides string functions as discussed elsewhere herein). Module 1122 outputs a representation of potentially used resources 1126. Optionally, the same may be compared with existing resources by a human or a suitable comparator module, as shown at 1128, resulting in a reduced representation of potentially used resources 1130.

In view of the discussion thus far, it will be appreciated that, in general terms, a method, according to an aspect of the invention, includes the step 104 of identifying, in a computer program file, calls to stop functions. The stop functions are functions that interact with external resources. This step can be carried out, for example, by module 1112 of FIG. 11. The method also includes step 106 of identifying parameters of the calls to the stop functions that are references to the external resources. This step may be carried out, for example, by module 1118 of FIG. 11. The method further includes the step 108 of performing an analysis over the computer program file to find out possible values of the parameters of the calls. This step may be carried out, for example, by module 1122 of FIG. 11.

As noted, while in a typical instance, the computer program file is a computer program source code listing, in some cases, the computer program file may be a binary file.

In some cases, an additional step includes comparing the possible values of the parameters of the calls to a list of available resources in order to obtain a list of dependencies on the external resources. See the above discussion of blocks 1128 and 1130 in FIG. 11. The comparison can also include, in some cases, classifying the stop functions by resource type, in which case the comparing of the possible values of the parameters of the calls to the list of available resources is carried out based on the resource types.

Non-limiting examples of stop functions include read, write, execute, delete, and connect to.

Non-limiting examples of the parameters that are references to the external resources include path and file name of a file being one of read, written, and deleted; path and name of a program being executed; and/or name and location of a database being connected to.

In many (but as discussed elsewhere, not necessarily all) cases, the parameters of the calls comprise string parameters.

With reference to FIG. 2, the computer program source code listing is typically prepared in a programming language and in some cases, step 104 includes preparing a list of potential stop functions of the programming language used, as per step 202; finding function calls in the computer program source code listing, as per step 204; and filtering the function calls to find the calls to the stop functions, as at step 206. The finding of the function calls in 204 is, in at least some cases, carried out by conducting a detailed static analysis of the computer program source code listing. In some cases, the programming language includes library functions, and additional steps include classifying those of the library functions, which lead to use of the external resources via known string parameters, directly as stop functions; classifying those of the library functions that never call the external resources as internal, for omission in subsequent analysis; and, for any function calls to any of the library functions not previously classified directly as either (i) stop functions or (ii) internal, repeating the preparing, finding, and filtering steps for source code of the library functions not previously classified, as per step 208. See the above discussion of blocks 1108, 1110, 1112, and 1114 for further exemplary details.

With reference to FIG. 3, again, in some cases, the computer program source code listing is prepared in a programming language. An alternative way to carry out step 104 includes preparing a list of potential stop functions of the programming language, as per step 302; and conducting a string search for the potential stop functions in the computer program source code listing, as per step 304. In a case where the programming language comprises library functions, additional steps include classifying those of the library functions, which lead to the use of external resources via known string parameters, directly as stop functions; classifying those of the library functions that never call external resources as internal, for omission in subsequent analysis; and for any function calls to any of the library functions not previously classified directly as (i) stop functions or (ii) internal, repeating the preparing and conducting steps for source code of the library functions not previously classified, as per step 308. See the above discussion of blocks 1108, 1110, 1112, and 1114 for further exemplary details.

Identifying External Resources Through a Sequence of Stop Functions

Figure 14:
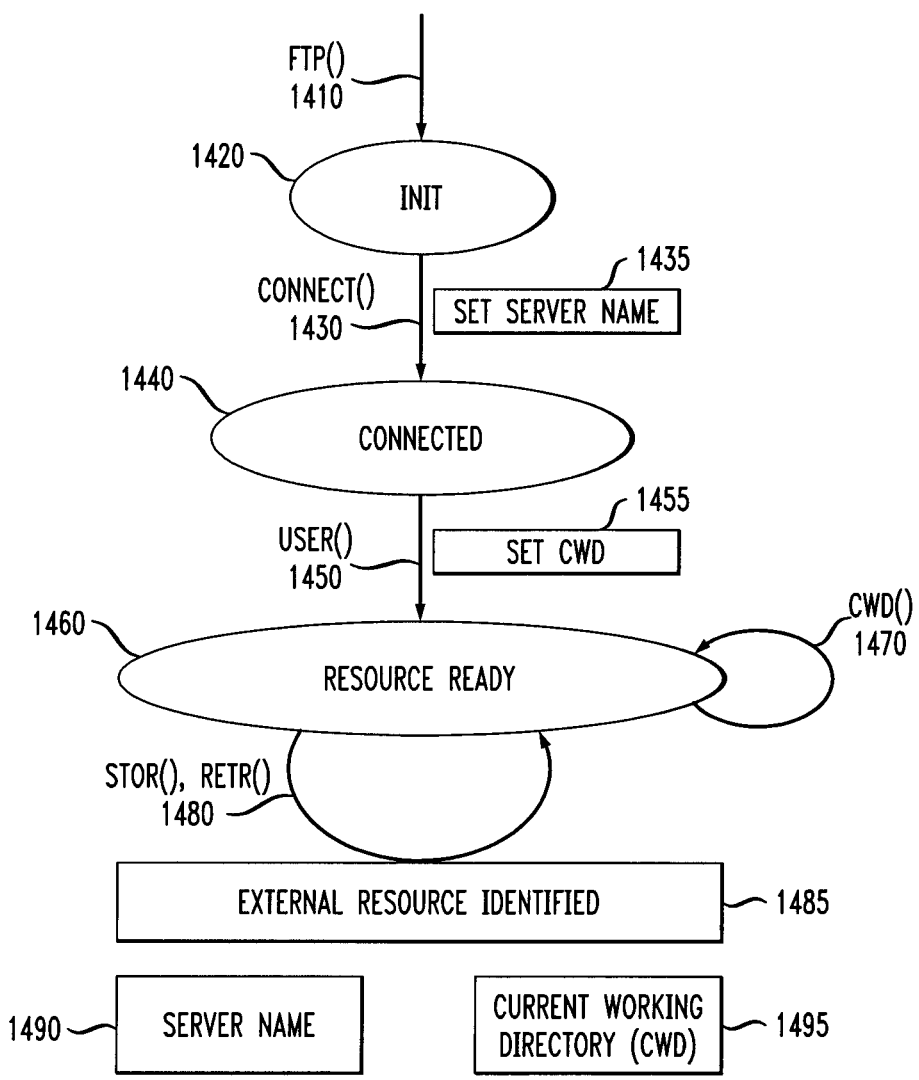
FIG. 14 is an exemplary state diagram for using an embodiment of the invention to identify external resources on file transfer protocol (FTP) servers.

FIG. 14 presents a state diagram for using one or more embodiments, in combination with typestate checking, to identify external resources on FTP servers. External resources are often not fully specified through the parameters of any one stop function. In many cases, an external resource is identified through a collection of parameters which are passed through a sequence of stop functions. For example, a directory of an FTP (file transfer protocol) server may be considered an external resource. Programs typically interact with FTP servers by connecting to a server; entering credentials (for example, userid and password); selecting the appropriate directory; and retrieving or storing files.

The external resource (that is, the file being retrieved or stored) is identified by the server, directory, and filename. FIG. 14 shows a state diagram for determining external resources of programs which use functions found within the well-known Apache FTP package available from the Apache Software Foundation. As shown at 1410, the state diagram begins at the portions of the program where the commons.net FTP object is instantiated. The state diagram enters an init state 1420. When typestate analysis of the program detects, at 1430, a call to a connect method, the server name is extracted from that stop method and stored in the temporary server name field 1490. The state machine moves to the connected state 1440. A call to the user( ) 1450 stop method causes the state machine to store 1455 the username in the current working directory (cwd) field 1495. The initial value of this field is typically a tilde (~) followed by the username value passed as the first parameter of the user stop method. The state machine then enters a resource ready state 1460.

Note the set server name block 1435.

When the state machine is in the resource ready state 1460, detection of a cwd( ) 1470 stop method invocation causes the state machine to reset 1455 the current working directory (cwd) field 1495. The state machine then remains at state 1460.

Detection 1480 of a stor( ) or retr( ), e.g. "store file" or "retrieve file", stop method invocation causes the state machine to identify the external resource being referenced, as at 1485. The identity of the resource is taken from the server name 1490 and current working directory (cwd) 1495 fields, and also the filename parameter of the stop method. The state machine then returns to state 1460.

Other states and state transitions will also be apparent to those of skill in the art, such as a state transition from resource ready 1460, to connected 1440 if a connect( ) method invocation is detected (for example, if the FTP object is reused).

By way of review, in one or more embodiments, capture not only strings and other variables passed into stop-functions, but also track the sequence of stop-functions. Thus, in the example above, if the program is like:

1) ftp-connect-to ("ftp.backups.ibm.com")
2) write-file ("/usr/bpfitzm", "foo.txt")
3) ftp-connect-to ("ftp.commonprograms.ibm.com")
4) read-file ("/progs/Windowscode", "fee.c")

then one or more embodiments of the invention identify that connections are made to ftp.backups.ibm.com and ftp.commonprograms.ibm.com. Furthermore, it would be known that foo.txt is written, and fee.c is read. However, in embodiments not identifying external resources through a sequence of stop functions, it would not necessarily be known that ftp.backups.ibm.com is the server that foo.txt is written to, and that fee.c is read from the commonprograms server. The techniques described in this section show how to make this association, thus showing that lines (1) and (2) go together, as do lines (3) and (4).

Given the teachings herein, the skilled artisan will be able to implement techniques identifying external resources through a sequence of stop functions; for example, by adapting known material from the following references, each of which is expressly incorporated herein in its entirety for all purposes (the latter two published papers describe typestate analysis and state diagrams techniques which, given the teachings herein, can be applied by the skilled artisan as described with respect to FIG. 14.):

Compilers, Principles, Techniques and Tools, Alfred V. Aho, Ravi Sethi, Jeffrey D. Ullman, Addison-Wesley, Reading, Mass. (1986), especially Chapter 10, "Code Optimization." This textbook, which introduces the concept of data flow and shows how to construct programs for data flow analysis, will be familiar to the skilled artisan.

Wikipedia entry for "Data flow analysis" available at the on-line encyclopedia "Wikipedia" as published by the Wikimedia Foundation, Inc., San Francisco, Calif., USA 2009, pages 1-7.

Wikipedia entry for "Reaching definition" available at the on-line encyclopedia "Wikipedia" as published by the Wikimedia Foundation, Inc., San Francisco, Calif., USA 2009, pages 1-2.

Effective typestate verification in the presence of aliasing, Stephen J. Fink, Eran Yahav, Nurit Dor, G. Ramalingam, Emmanuel Geay, Transactions on Software Engineering and Methodology (TOSEM), April 2008, published by the Association for Computing Machinery, New York, N.Y., USA.

Modular Typestate Checking of Aliased Objects, Kevin Bierhoff, Jonathan Aldrich, Presented at OOPSLA '07, Oct. 21-25, 2007, Montréal, Québec, Canada, Proceedings of the 22nd Annual ACM SIGPLAN Conference on Object-Oriented Programming, Systems, Languages, and Applications, OOPSLA 2007, Oct. 21-25, 2007, Montreal, Quebec, Canada. ACM 2007, ISBN 978-1-59593-786-5, published by the Association for Computing Machinery, New York, N.Y., USA.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 12:
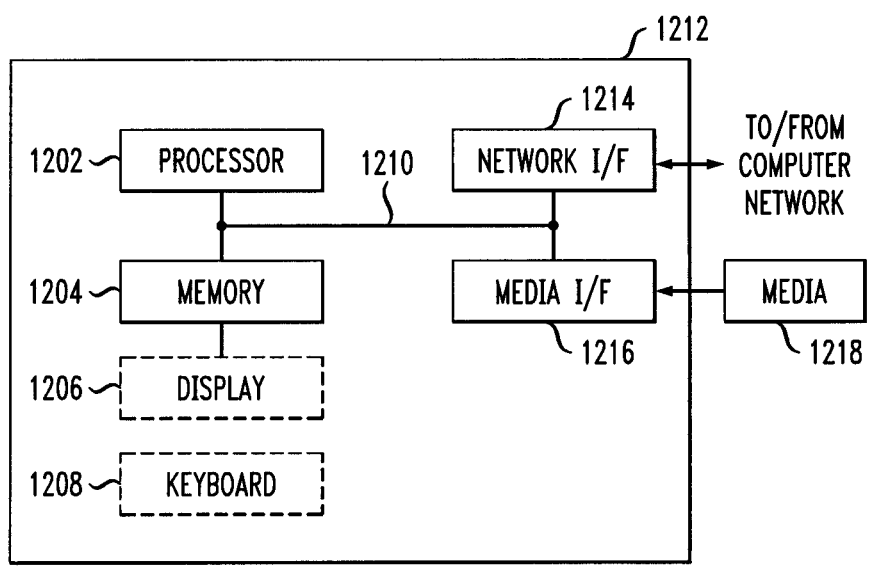
FIG. 12 depicts a computer system that may be useful in implementing one or more aspects and/or elements of the invention.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 1218) providing program code for use by or in connection with a computer or any instruction implementation system. For the purposes of this description, a computer usable or computer readable medium can be any apparatus for use by or in connection with the instruction implementation system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable recordable storage medium (as distinct from a propagation or transmission medium) include a semiconductor or solid-state memory (for example memory 1204), magnetic tape, a removable computer diskette (for example media 1218), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like; a scripting language such as Perl and bash; a functional language such as ML; and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable recordable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable recordable storage medium; the modules can include, for example, any or all of the components shown in FIG. 11. The method steps can then be carried out using the distinct software modules and/or sub-modules of the system, as described above, executing on one or more hardware processors 1202. Further, a computer program product can include a tangible computer-readable recordable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
 identifying, in a computer program file, calls to stop functions, said stop functions comprising functions that interact with external resources, said computer program file comprises a computer program source code listing prepared in a programming language, and said identifying said calls to said stop functions comprises:
  preparing a list of potential stop functions of said programming language,
  finding function calls in said computer program source code listing, and
  filtering said function calls to find said calls to said stop functions;
 identifying parameters of said calls to said stop functions that are references to said external resources;
 performing an analysis over said computer program file to find out possible values of said parameters of said calls;
 comparing said possible values of said parameters of said calls to a list of available resources in order to obtain a list of dependencies on said external resources; and
 applying format transformation to said possible values of said parameters of said calls to extract said external resource references.

2. The method of claim 1, wherein said computer program file comprises a binary file.

3. The method of claim 1, further comprising classifying said stop functions by resource type, wherein said comparing of said possible values of said parameters of said calls to said list of available resources is carried out based on said resource types.

4. The method of claim 1, wherein said stop functions comprise read, write, execute, delete, and connect to functions.

5. The method of claim 1, wherein said parameters that are references to said external resources comprise at least one of:
path and file name of a file being one of read, written, and deleted;
path and name of a program being executed; and
name and location of a database being connected to.

6. The method of claim 1, wherein said parameters of said calls comprise string parameters, and wherein said analysis over said computer program file comprises a string analysis.

7. The method of claim 1, wherein said finding of said function calls is carried out by conducting a detailed static analysis of said computer program source code listing.

8. The method of claim 1, wherein said programming language comprises library functions, further comprising:
classifying those of said library functions, which lead to use of said external resources via known string parameters, directly as ones of said stop functions;
classifying those of said library functions that never call said external resources as internal, for omission in subsequent analysis; and
for any function calls to any of said library functions not previously classified directly as one of stop functions and internal, repeating said preparing, finding, and filtering steps for source code of said library functions not previously classified.

9. The method of claim, wherein said step of identifying said calls to said stop functions further comprises: conducting a string search for said potential stop functions in said computer program source code listing.

10. The method of claim 9, wherein said programming language comprises library functions, further comprising:
classifying those of said library functions, which lead to the use of external resources via known string parameters, directly as ones of said stop functions;
classifying those of said library functions that never call external resources as internal, for omission in subsequent analysis; and
for any function calls to any of said library functions not previously classified directly as stop functions or internal, repeating said preparing and conducting steps for source code of said library functions not previously classified.

11. The method of claim 1, further comprising identifying at least one additional external resource reference through a sequence of said stop functions.

12. The method of claim 1, wherein:
said identifying, in said computer program file, of said calls to stop functions, is carried out by a stop function searcher module executing on at least one hardware processor;
said identifying of said parameters of said calls to said stop functions is carried out by a resource parameter identifier module executing on said at least one hardware processor; and
said performing of said analysis over said computer program file to find out said possible values of said parameters of said calls is carried out by said resource parameter value approximator module executing on said at least one hardware processor, wherein the stop function searcher, resource parameter identifier, and resource parameter value approximator modules are parts of a system.

13. A computer program product comprising a tangible computer readable recordable storage medium including computer usable program code, the computer program product including:
computer usable program code for identifying, in a computer program file, calls to stop functions, said stop functions comprising functions that interact with external resources, said computer program file comprises a computer program source code listing prepared in a programming language, and said identifying said calls to said stop functions comprises:
preparing a list of potential stop functions of said programming language,
finding function calls in said computer program source code listing, and
filtering said function calls to find said calls to said stop functions;
computer usable program code for identifying parameters of said calls to said stop functions that are references to said external resources;
computer usable program code for performing an analysis over said computer program file to find out possible values of said parameters of said calls;
computer usable program code for comparing said possible values of said parameters of said calls to a list of available resources in order to obtain a list of dependencies on said external resources; and
computer usable program code for applying format transformation to said possible values of said parameters of said calls to extract said external resource references.

14. The computer program product of claim 13, further comprising distinct software modules, each of the distinct software modules being embodied on the tangible computer-readable recordable storage medium, the distinct software modules comprising a stop function searcher module, a resource parameter identifier module, and a resource parameter value approximator module, wherein;
said stop function searcher module comprises said computer usable program code for identifying, in said computer program file, said calls to said stop functions;
said resource parameter identifier module comprises said computer usable program code for identifying said parameters of said calls to said stop functions; and
said resource parameter value approximator module comprises said computer usable program code for performing said analysis over said computer program file to find out said possible values of said parameters of said calls.

15. An apparatus comprising:
a memory; and
at least one processor, coupled to the memory, and operative to:
identify, in a computer program file, calls to stop functions, said stop functions comprising functions that interact with external resources, said computer program file comprises a computer program source code listing prepared in a programming language, and said identify said calls to said stop functions comprises:
prepare a list of potential stop functions of said programming language,
find function calls in said computer program source code listing, and
filter said function calls to find said calls to said stop functions;

identify parameters of said calls to said stop functions that are references to said external resources;

perform an analysis over said computer program file to find out possible values of said parameters of said calls;

compare said possible values of said parameters of said calls to a list of available resources in order to obtain a list of dependencies on said external resources; and apply format transformation to said possible values of said parameters of said calls to extract said external resource references.

16. The apparatus of claim 15, wherein said processor is further operative to compare said possible values of said parameters of said calls to a list of available resources in order to obtain a list of dependencies on said external resources.

17. The apparatus of claim 15, further comprising a tangible computer-readable recordable storage medium having distinct software modules embodied thereon, wherein the distinct software modules comprise a stop function searcher module, a resource parameter identifier module, and a resource parameter value approximator module; wherein:

said identifying, in said computer program file, of said calls to stop functions, is carried out by said stop function searcher module executing on said at least one processor;

said identifying of said parameters of said calls to said stop functions is carried out by said resource parameter identifier module executing on said at least one processor; and said performing of said analysis over said computer program file to find out said possible values of said parameters of said calls is carried out by said resource parameter value approximator module executing on said at least one processor.

18. An apparatus comprising:

means for identifying, in a computer program file, calls to stop functions, said stop functions comprising functions that interact with external resources, said computer program file comprises a computer program source code listing prepared in a programming language, and said identifying said calls to said stop functions comprises:

preparing a list of potential stop functions of said programming language, finding function calls in said computer program source code listing, and filtering said function calls to find said calls to said stop functions;

means for identifying parameters of said calls to said stop functions that are references to said external resources;

means for performing an analysis over said computer program file to find out possible values of said parameters of said calls;

means for comparing said possible values of said parameters of said calls to a list of available resources in order to obtain a list of dependencies on said external resources; and means for applying format transformation to said possible values of said parameters of said calls to extract said external resource references.

* * * * *